(12) United States Patent
Tsengas et al.

(10) Patent No.: US 6,568,433 B1
(45) Date of Patent: May 27, 2003

(54) PORTABLE FLUID DELIVERY DEVICE

(76) Inventors: Steven Tsengas, 7768 Litchfield Dr., Mentor, OH (US) 44060; Glenn R. Godley, 12615 Chesterfield La., Chesterland, OH (US) 44026; Patrick Baran, 2658 Scranton Rd., Cleveland, OH (US) 44113

( * ) Notice: Subject to any disclaimer, the term of this patent is extended or adjusted under 35 U.S.C. 154(b) by 0 days.

(21) Appl. No.: 10/008,131

(22) Filed: Nov. 5, 2001

(51) Int. Cl.$^7$ ................................................. B65B 1/04
(52) U.S. Cl. ........................... 141/2; 141/18; 141/380; 222/192; 30/141
(58) Field of Search ................................. 141/2, 18, 114, 141/98, 380, 381; 30/141, 123.3, 125; 222/192, 106, 205, 207, 212, 153.06, 153.14, 515, 549

(56) References Cited

U.S. PATENT DOCUMENTS

| | | | | | |
|---|---|---|---|---|---|
| 427,254 | A | * | 5/1890 | Danielowsky | 30/123.3 |
| 705,018 | A | * | 7/1902 | Bechtold | 222/424.5 |
| 2,795,043 | A | * | 6/1957 | Fleischer | 30/123.3 |
| 3,259,132 | A | * | 7/1966 | Katter | 30/324 |

* cited by examiner

*Primary Examiner*—Steven O. Douglas
(74) *Attorney, Agent, or Firm*—John D. Gugliotta; Olen L. York, III (57) ABSTRACT

Portable Fluid Delivery Device used for transporting water or other fluids comprising a shaft, a reservoir, and a means for holding a water bottle or other container. In a preferred embodiment, the Portable Fluid Delivery Device also comprises an optional attachment assembly in order to facilitate quick removal of the device from the article it is thereto attached for use.

13 Claims, 8 Drawing Sheets

*Fig. 8*

PORTABLE FLUID DELIVERY DEVICE

TECHNICAL FIELD

The present invention relates generally to a device for providing water or other fluids to animals or humans. Specifically, the present invention involves the use of a device that allows for attachment of a water bottle or other container to the device, attachment of the device to a belt or other convenient article, and allows for consumption of water or other fluids from the device while a pet owner is mobile.

BACKGROUND OF THE INVENTION

Providing water for household pets is usually accomplished using a stationary pet bowl. These pet bowls adequately serve the purpose of providing water for the pet in one fixed location, but are not well suited to provide water to the pet while the pet and owner are mobile. The bowl can be difficult for the owner to carry and water can spill. Owners that wish to provide water to their pets while mobile must use these existing stationary bowls or existing portable pet watering devices. These existing portable devices prevent water from spilling when mobile, but are inconvenient and bulky to carry.

Therefore, in light of the foregoing deficiencies in the prior art, the applicant's invention is herein presented.

SUMMARY OF THE INVENTION

It is an object of the present invention to facilitate the convenient carrying and dispensing of fluids to pets or humans while mobile. Preferably, the present invention comprises a shaft, a reservoir, and means for attaching a water bottle or similar container to the shaft. Depending on the embodiment, the device could have rigid bands that hold the water bottle with a friction fit, flexible or adjustable bands that wrap around the water bottle, or clip like appendages which can be spread apart to receive a water bottle.

It is preferred that the device has a mechanism to attach the device to a person or other suitable article. Depending upon the embodiment, the attachment mechanism may be a belt clip, belt slot or other similar mechanism. The attachment mechanism allows the user to detach the device when desired by a user.

The reservoir may be used to hold water dispensed from a water bottle or other source and serves as a bowl for the pet to drink from. Preferably the device also comprises a mechanism that prevents slippage of a water bottle along the shaft such as stop members along the shaft of the device. These stop members ("dimples") are appendages along the shaft that prevent an attached water bottle from sliding along the shaft.

In operation while walking a pet, a person can detach the device from the article it is thereto attached, and dispense fluid from the water bottle. This dispensing process may take place while the water bottle is still attached to the device. Once fluid fills the fluid reservoir, the pet may then consume it. Once finished, the entire device may be re-attached to the person or otherwise stored. A further feature of the present invention is that a bottle can be conveniently removed for immediate use while one is mobile.

DETAILED DESCRIPTION OF THE PREFERRED EMBODIMENT

Figure 1:
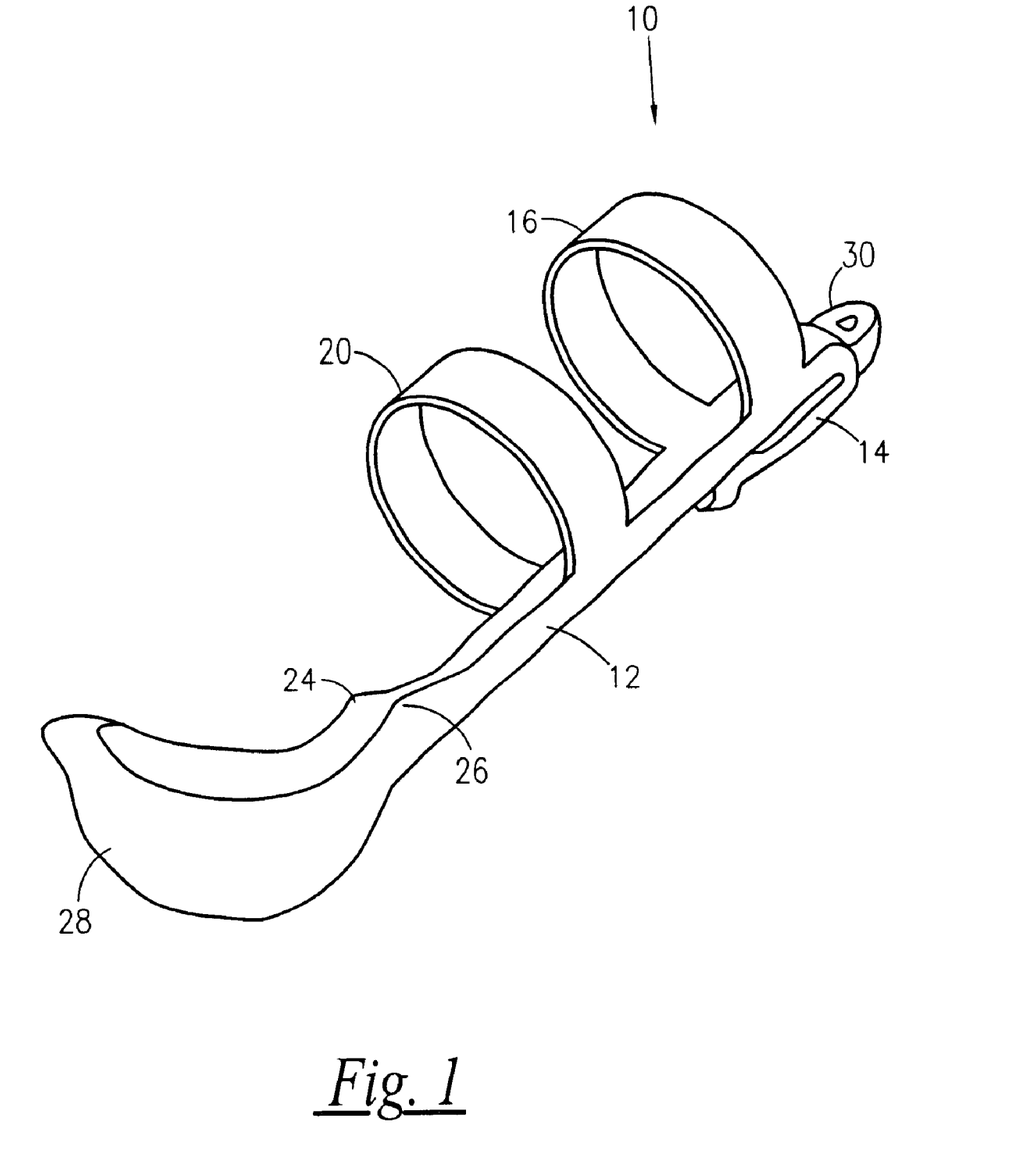
FIG. 1 is a perspective view of a preferred embodiment of a Portable Fluid Delivery Device according to the present invention.

A preferred Portable Fluid Delivery Device 10 is shown in FIG. 1. The Portable Fluid Delivery Device 10 comprises a shaft 12 having a first and second end, a partial cup-shaped reservoir 28, and at least one full annular band, 16 or 20. The Portable Fluid Delivery Device 10 may be used to hold and dispense fluid for a pet or human while mobile. The embodiment shown also includes an optional attachment assembly 14 used to attach the Portable Fluid Delivery Device 10 to an article of clothing of the user or any other suitable article. The attachment assembly 14 facilitates quick detachment of the Portable Fluid Delivery Device for use. The attachment assembly shown comprises a belt-clip assembly located at the first end of said shaft. Other attachment assemblies are contemplated such as a fixed belt slot, a hook and loop attachment mechanism, or other attachment assemblies known in the art.

This embodiment also includes an optional means for storing the device upon a peg. The means for storing the device shown comprises an appendage 30 at the first end of the shaft having a hole through the center of said appendage. This embodiment also includes an optional means for preventing slippage of an attached water bottle along the shaft. The means for preventing slippage shown comprises a pair of dimples 24 and 26.

In the embodiment shown in FIG. 1, an upper full annular band 16 and a lower full annular band 20 are located along the shaft 12. The upper full annular band 16, and lower full annular band 20 are used to selectively attach a water bottle along said shaft 12. A water bottle may be inserted through the upper full annular band 16 and then through the lower full annular band 20. Other means for securing a water bottle to said device are contemplated such as at least one annular band, a hook and loop attachment mechanism, at least one adjustable strap, or other means of attachment readily known in the art. It is further contemplated that a water bottle may be integrated into the Portable Fluid Delivery Device 10 in the form of a vessel located along the shaft 12.

The dimples 24, 26 are appendages protruding from said shaft 12. Dimples 24, 26 are used to prevent slippage of a water bottle that is positioned along shaft 12. Other embodiments for preventing slippage of an attached water bottle are contemplated, such as the use of varying sized annular bands, non-slip surfaces along the shaft 12 or on the inner surface of annular bands 16 & 20, and other slippage prevention means known in the art.

The reservoir 28 is located at the second end of said shaft. The reservoir 28 may be any shape that is capable of containing and giving access to fluid. A user may detach the Portable Fluid Delivery Device 10 from an article it is thereto attached and dispense fluid from an attached water bottle. The fluid reservoir 28 retains fluid and may serve as a water bowl for the pet. The fluid reservoir is contemplated as being made in varying sizes and shapes. Although not shown, an optional reservoir drain hole is also contemplated and could be added by one ordinarily skilled in the art.

Figure 2:
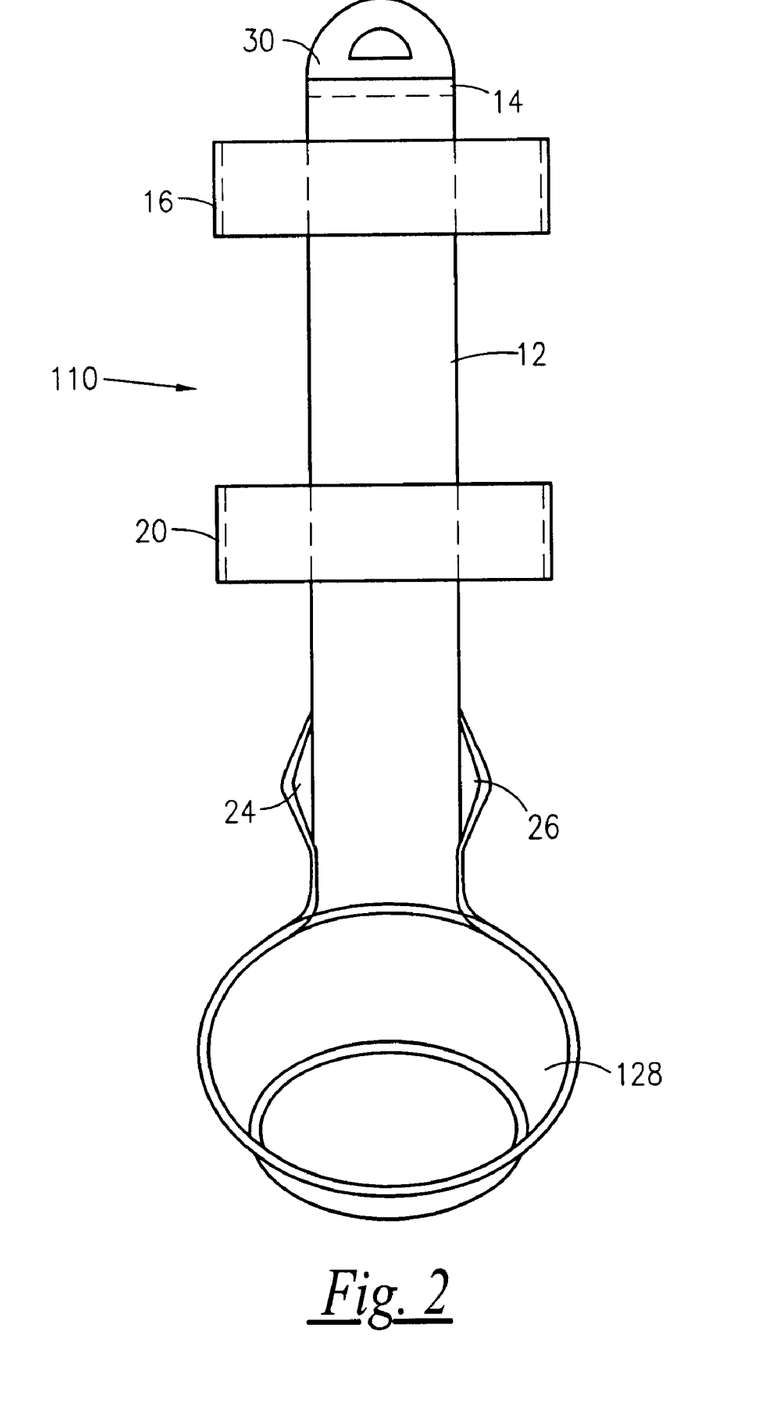
FIG. 2 is a front elevational view of a preferred embodiment of a Portable Fluid Delivery Device according to the present invention.
Figure 3:
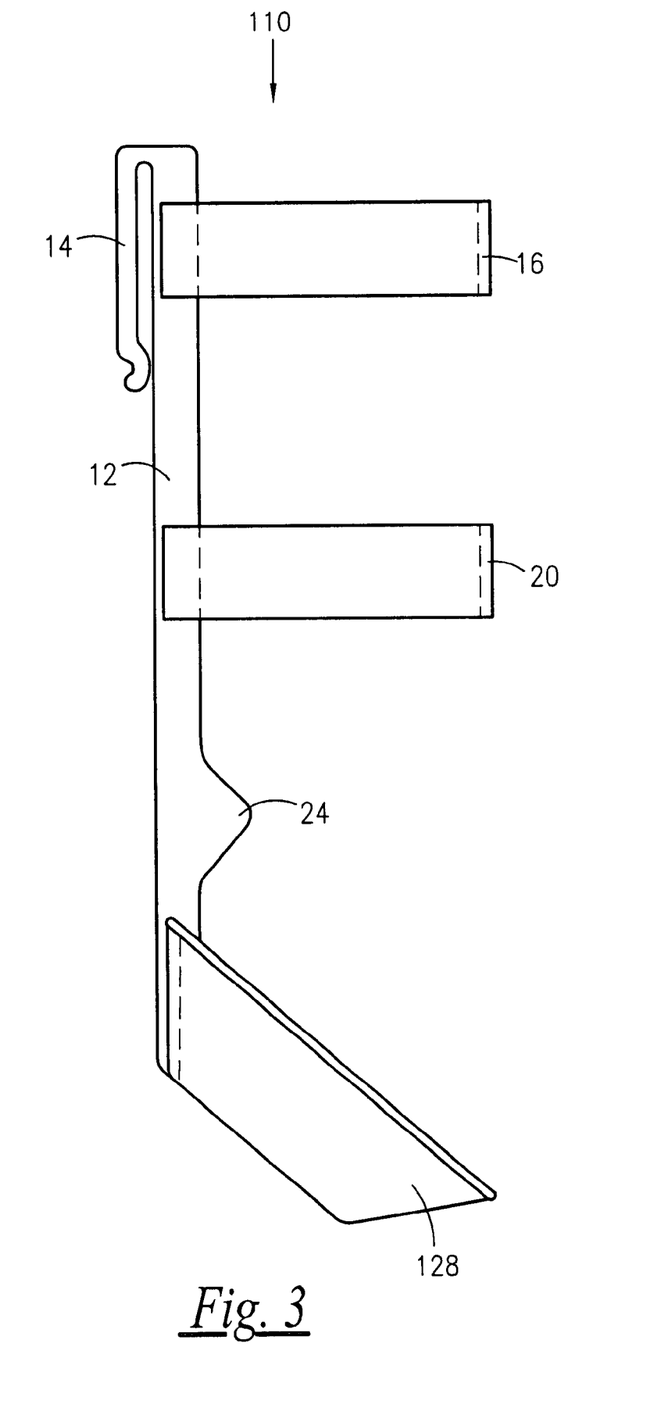
FIG. 3 is a left side elevational view of a preferred embodiment of a Portable Fluid Delivery Device shown in FIG. 2 according to the present invention.
Figure 4:
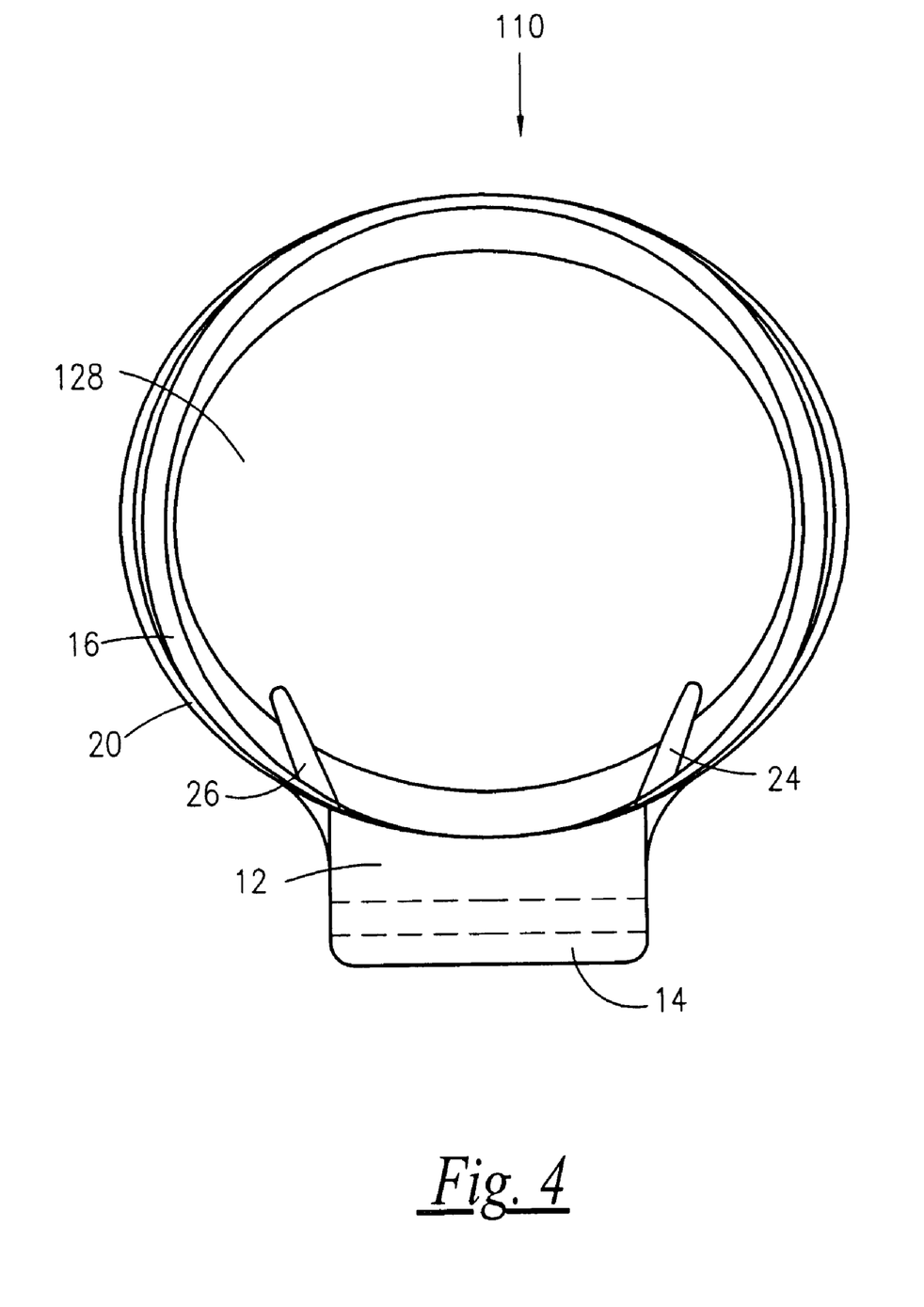
FIG. 4 is a top plan view of a preferred embodiment of a Portable Fluid Delivery Device shown in FIG. 2 according to the present invention.

A further preferred Portable Fluid Delivery Device 110 is described in FIG. 2, FIG. 3, and FIG. 4 having an alternate embodiment of the fluid reservoir 128, in lieu of the fluid reservoir 28 shown in FIG. 1.

Figure 5:
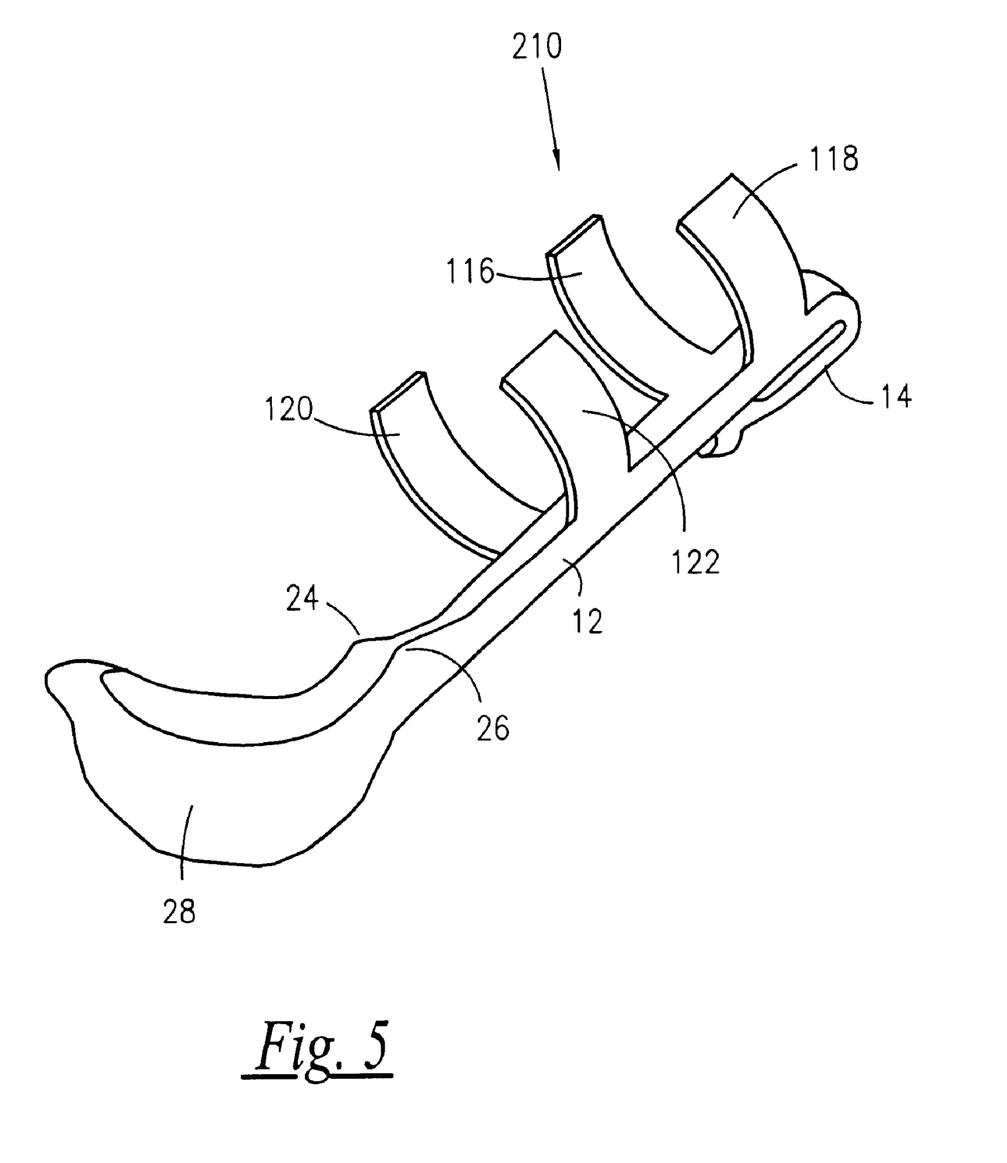
FIG. 5 is a perspective view of a preferred embodiment of a Portable Fluid Delivery Device according to the present invention.

A further preferred Portable Fluid Delivery Device 210 is described in FIG. 5 having at least one pair of gripping appendages 116 and 118, and/or 120 and 122 in lieu of the full annular bands 16, 20 described in FIG. 1, FIG. 2, FIG. 3, and FIG. 4. The gripping appendages 116, 118, 120, 122 are used as a means to selectively attach a water bottle to the Portable Fluid Delivery Device 210. The gripping appendages 116, 118, 120, 122 preferably are fabricated using plastic that has a "memory", in that it will return to its original shape after being flexed. Still other attachment means could be used in lieu of the appendages 116, 118, 120, 122 such as clips, straps, or other attachment means readily known to the art.

Figure 6:
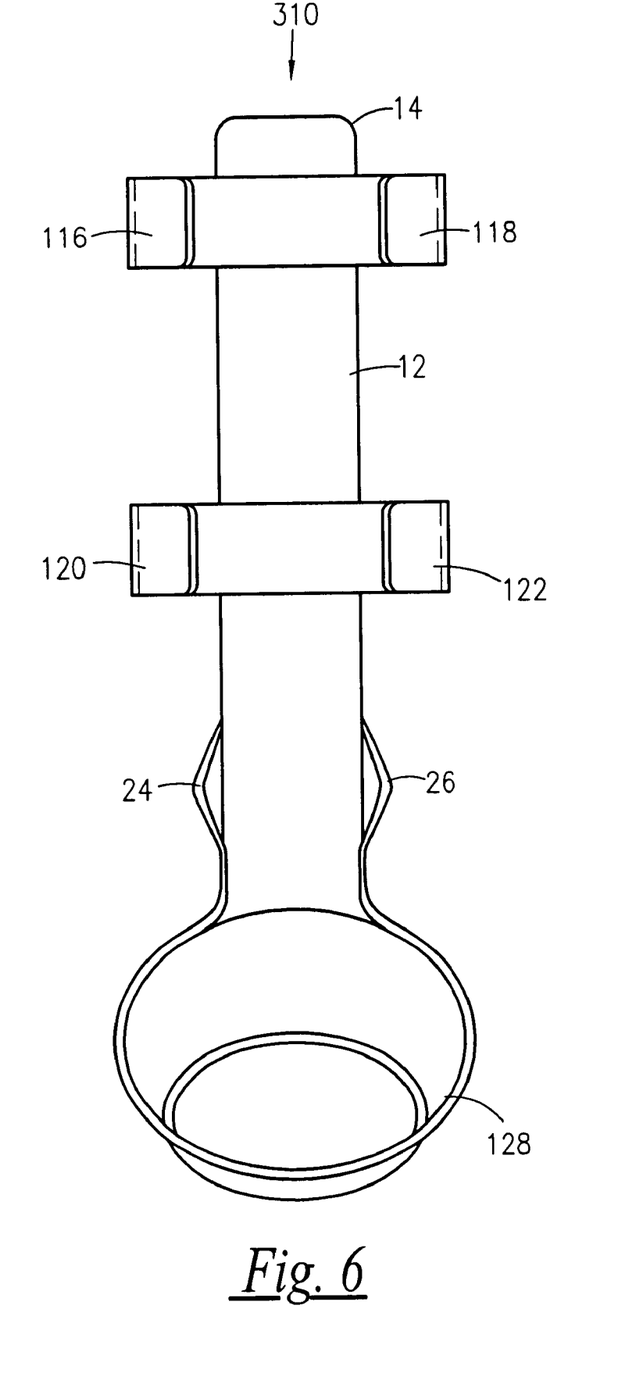
FIG. 6 is a front elevational view of a preferred embodiment of a Portable Fluid Delivery Device according to the present invention.
Figure 7:
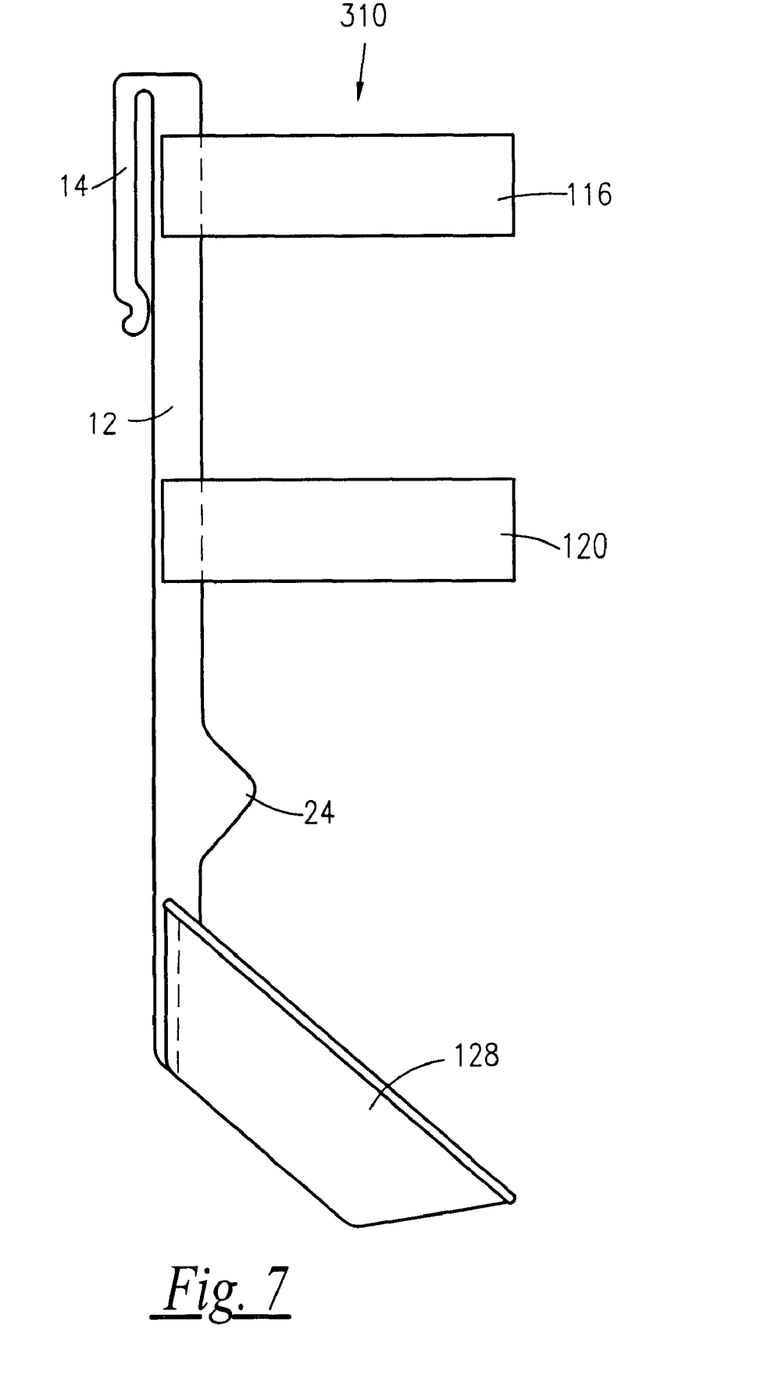
FIG. 7 is a left side elevational view of a preferred embodiment of a Portable Fluid Delivery Device shown in FIG. 7 according to the present invention.

A further preferred Portable Fluid Delivery Device 310 is described in FIG. 6 and FIG. 7. The Portable Fluid Delivery Device 310 is similar to preferred Portable Fluid Delivery Device 110 described in FIGS. 2, 3, and 4, with the substitution of appendages 116, 118, 120, and 122 in lieu of full annular bands 16 and 20.

Figure 8:
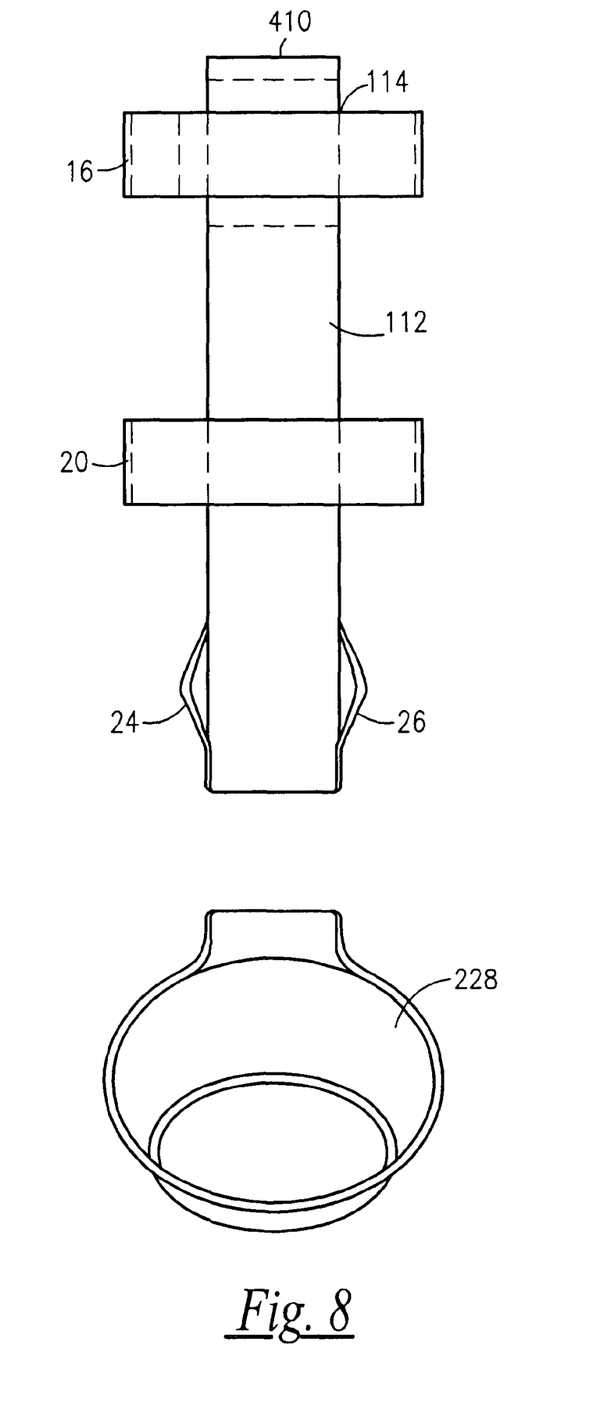
FIG. 8 is a front elevational view of a preferred embodiment of a Portable Fluid Delivery Device according to the present invention.

A further preferred Portable Fluid Delivery Device 410 described in FIG. 8 has a slot 114 through the first end of the shaft 112 in lieu of the belt-clip assembly shown in FIGS 1, 2, 3, 4, 5, 6, and 7. Said Portable Fluid Delivery Device 410 is shown with an optional reservoir 228 that is detachable from the shaft 112. Detachment of said fluid reservoir allows for additional uses of said Portable Fluid Delivery Device such as the transportation of water for use by humans and/or the placement of the fluid reservoir on the ground or other suitable surface for use as a stationary pet bowl.

Portable Fluid Delivery Devices according to the present invention may be manufactured from any of a plurality of materials that are generally known to those ordinarily skilled in the art including, but not limited to appropriate plastics, wood, or composition material. Preferably, they may be manufactured from appropriate polypropylene plastics. They may be manufactured using techniques well known to those ordinarily skilled in the art.

The forgoing disclosure is illustrative of the present invention and is not to be construed as limiting thereof. Although one or more embodiments of the invention have been described, persons of ordinary skill in the art will readily appreciate that numerous modifications could be made without departing from the scope and spirit of the disclosed invention. As such, it should be understood that all such modifications are intended to be included within the scope of this invention. The written description and drawings illustrate the present invention and are not to be construed as limited to the specific embodiments disclosed.

What is claimed is:

1. A Portable Fluid Delivery Device comprising:
   a shaft with a first and second end;
   at least one retention band for selectively attaching a container to said shaft;
   a reservoir for retaining fluid at the second end of said shaft, said reservoir comprising a bowl shape with substantially vertical sidewalls for retaining a quantity of fluid sufficient to re-hydrate a user;
   an attachment assembly for selectively attaching said device to an object during transport or non-use; and
   at least one dimple positioned along said shaft, said first dimple provided to prevent slippage of said container retained by said retention band.

2. The device recited in claim 1, wherein said retention band comprises a non-slip affixed to an internal perimeter of said retention band.

3. The device recited in claim 1, wherein said retention band further comprises a full annular retention band affixed to said shaft.

4. The device recited in claim 1, further comprising a second retention band, said second retention band comprises a full annular retention band affixed to said shaft.

5. The device recited in claim 1, wherein said retention band comprises a partially annular retention band affixed to said shaft, said partially annular retention band further comprises a pair of returnably resilient gripping appendages laterally spaced apart to accommodate insertion of said container therein.

6. The device recited in claim 1, further comprising a second retention band, said second retention band comprises a partially annular retention band affixed to said shaft, said second retention band further comprises a pair of returnably resilient gripping appendages laterally spaced apart to accommodate insertion of said container therein, said second retention band aligned with said first retention band so that said container may insert into said first and said second retention band.

7. The device recited in claim 1, wherein said reservoir is removably attachable to said shaft about said second end.

8. The device recited in claim 7, wherein said reservoir is disposed to receive quantity of fluid from said container without removing said container from said shaft.

9. The device recited in claim 1, wherein said attachment assembly for selectively attaching said device to an object comprises a belt clip, said belt clip removably attached to said shaft.

10. The device recited in claim 1, wherein said attachment assembly for selectively attaching said device to an object comprises a slot formed in said first end of said shaft.

11. The device recited in claim 1 further comprising a second dimple positioned along said shaft, said second dimple laterally positioned to said first dimple to prevent slippage of said container retained by said retention band.

12. The device recited in claim 1 further comprising a non-slip surface affixed to a lateral surface of said shaft, said non-slip surface intermediate to said lateral surface and said container affixed thereto.

13. A method of fluid delivery comprising the steps of:

adding a predetermined amount of fluid to a fluid container;

attaching said fluid container to a portable fluid delivery device comprising a shaft with a first and second end, at least one retention band for selectively attaching a container to said shaft;

a reservoir for retaining fluid at the second end of said shaft, said reservoir comprising a bowl shape with substantially vertical sidewalls for retaining a quantity of fluid sufficient to re-hydrate a user;

an attachment assembly for selectively attaching said device to an object during transport or non-use; and at least one dimple positioned along said shaft, said first dimple provided to prevent slippage of said container retained by said retention band;

providing said portable fluid delivery device at a predetermined height; and delivering fluid to said means for retaining fluid.

* * * * *